(12) United States Patent
Chen

(10) Patent No.: US 8,919,712 B2
(45) Date of Patent: Dec. 30, 2014

(54) SUCKER ASSEMBLY HAVING A BETTER ATTACHMENT EFFECT

(75) Inventor: Lung-Chih Chen, Tanzih Township, Taichung County (TW)

(73) Assignee: Ferro-Carbon Ent. Co., Ltd., Tanzih Township (TW)

( * ) Notice: Subject to any disclaimer, the term of this patent is extended or adjusted under 35 U.S.C. 154(b) by 0 days.

(21) Appl. No.: 12/825,408

(22) Filed: Jun. 29, 2010

(65) Prior Publication Data

US 2011/0315839 A1 Dec. 29, 2011

(51) Int. Cl.
*A45D 42/14* (2006.01)
*F16B 47/00* (2006.01)

(52) U.S. Cl.
CPC .................... *F16B 47/006* (2013.01)
USPC .................. 248/205.8; 248/206.2; 248/309.3; 248/304

(58) Field of Classification Search
USPC ................. 248/205.8, 206.2, 363, 309.3, 304
See application file for complete search history.

(56) References Cited

U.S. PATENT DOCUMENTS

| | | | | |
|---|---|---|---|---|
| 4,244,546 A * | 1/1981 | Mertes et al. | ................. | 248/258 |
| 5,257,861 A * | 11/1993 | Domenig et al. | .......... | 312/334.5 |
| 5,349,723 A * | 9/1994 | Domenig | ....................... | 16/94 R |
| 6,131,865 A * | 10/2000 | Adams | ........................ | 248/206.2 |
| 6,494,550 B1 * | 12/2002 | Chen et al. | ................. | 312/334.5 |
| D469,001 S * | 1/2003 | Branson, Jr. | ................... | D8/374 |
| 6,757,937 B2 * | 7/2004 | Salice | ........................... | 16/94 R |
| 7,090,320 B2 * | 8/2006 | Chen et al. | ................. | 312/334.5 |
| 7,331,644 B2 * | 2/2008 | Lowe | ......................... | 312/334.4 |
| 7,658,354 B2 * | 2/2010 | Wang | ......................... | 248/205.5 |
| 2002/0101143 A1 * | 8/2002 | Crooks et al. | .............. | 312/334.5 |
| 2003/0160552 A1 * | 8/2003 | Bacho et al. | ............... | 312/334.5 |
| 2005/0264146 A1 * | 12/2005 | Fitz | ............................ | 312/334.5 |
| 2008/0230662 A1 * | 9/2008 | Takahashi et al. | ......... | 248/206.2 |

* cited by examiner

*Primary Examiner* — Terrell McKinnon
*Assistant Examiner* — Daniel Breslin

(57) ABSTRACT

A sucker assembly includes a sucker (10), a pull bar (13) secured on the sucker, a pressing seat (30) mounted on the pull bar and encompassing the sucker, a control handle (40) pivotally mounted on the pressing seat, and a pivot shaft (45) extending through the control handle, the pressing seat and the pull bar. The sucker includes a first layer (11) and a second layer (12). Thus, when the sucker is placed on a rough surface, the first layer of the sucker can be deformed elastically to fill the corrugated gaps of the rough surface, so that the first layer of the sucker is bonded onto the surface closely to prevent ambient air from entering the space between the sucker and the rough surface to keep the vacuum state of the sucker.

5 Claims, 7 Drawing Sheets

SUCKER ASSEMBLY HAVING A BETTER ATTACHMENT EFFECT

BACKGROUND OF THE INVENTION

1. Field of the Invention

The present invention relates to an attachment and, more particularly, to a sucker assembly that is attached to an object, such as a wall and the like.

2. Description of the Related Art

A conventional sucker assembly in accordance with the prior art shown in FIGS. 8 and 9 comprises a sucker 70, a pull bar 701 secured on the sucker 70, a hollow pressing seat 71 mounted on the pull bar 701 and having a peripheral rim encompassing the sucker 70, an elastic member 72 mounted on the pull bar 701 and biased between the sucker 70 and the pressing seat 71, and a control handle 73 having a first end provided with a pressing portion 731 pivotally mounted on the pull bar 701 in an eccentric manner and pressing the pressing seat 71 and a second end provided with a driving portion 732. The pressing seat 71 has a surface formed with a through hole 711 to allow passage of the pull bar 701.

In operation, the sucker 70 is placed on a surface, such as a wall and the like. When the driving portion 732 of the control handle 73 is driven, the pressing portion 731 of the control handle 73 is pivoted about the pull bar 701 in an eccentric manner and presses the pressing seat 71 to pull the pull bar 701 which pulls the sucker 70 toward the pressing seat 71 so that the sucker 70 is compressed and deformed by the peripheral rim of the pressing seat 71 to produce a vacuum suction force between the surface and the sucker 70 so as to attach the sucker 70 to the surface exactly.

However, when the surface is a rough or rugged surface, the sucker 70 cannot be deformed elastically to fill the corrugated gaps of the rough surface, so that ambient air will enter the space between the sucker 70 and the rough surface as shown in FIG. 9 to break the vacuum state of the sucker 70. Thus, the sucker 70 cannot be attached to the rough surface exactly.

BRIEF SUMMARY OF THE INVENTION

In accordance with the present invention, there is provided a sucker assembly, comprising a sucker, a pull bar secured on the sucker, a hollow pressing seat mounted on the pull bar and having a peripheral rim encompassing the sucker, an elastic member mounted on the pull bar and biased between the sucker and the pressing seat, a control handle pivotally mounted on the pressing seat, and a pivot shaft extending through the control handle, the pressing seat and the pull bar to connect the control handle with the pull bar.

The sucker includes a first layer and a second layer combined with the first layer. The first layer of the sucker is made of flexible and elastic material. The second layer of the sucker is made of hard material and has a hardness greater than that of the first layer. The second layer of the sucker faces the pressing seat and is movable to press the peripheral rim of the pressing seat. The control handle has a first end provided with a pressing portion pivotally mounted on the pivot shaft in an eccentric manner and pressing the pressing seat and a second end provided with a driving portion.

The pressing seat has a disk shape and has an central portion formed with a receiving chamber. The pressing seat has a side provided with a protruding hollow housing connected to the receiving chamber of the pressing seat. The housing of the pressing seat has two opposite sidewalls each formed with a guide slot connected to the receiving chamber of the pressing seat. The guide slot of the housing has an elongate shape and extends in an axial direction of the housing. The pressing portion of the control handle has a substantially forked shape and has an inner portion formed with a mounting recess pivotally mounted on the housing of the pressing seat. The pressing portion of the control handle has two opposite sidewalls each formed with a pivot hole pivotally mounted on the pivot shaft in an eccentric manner. The pivot hole of the pressing portion is connected to the mounting recess. The pull bar is movably mounted in the receiving chamber of the pressing seat and the housing of the pressing seat. The pull bar extends from a central portion of the second layer of the sucker and has a first end secured in the second layer of the sucker and a second end formed with a fixing hole secured on the pivot shaft and aligned with the guide slot of the housing. The second layer of the sucker is located between the first layer of the sucker and the pull bar. The pivot shaft in turn extends through the pivot hole of the control handle, the guide slot of the housing and the fixing hole of the pull bar to pivotally connect the control handle with the housing of the pressing seat and the pull bar and to attach the pull bar to the housing of the pressing seat. The pivot shaft is movable in the guide slot of the housing.

According to one embodiment of the present invention, the first layer and the second layer of the sucker laminate each other.

According to another embodiment of the present invention, the second layer of the sucker is inserted into the first layer of the sucker.

According to another embodiment of the present invention, the second layer of the sucker is extended through and is concentric with the first layer of the sucker.

The primary objective of the present invention is to provide a sucker assembly having a better attachment effect.

According to the primary advantage of the present invention, when the sucker is placed on a rough surface, the first layer of the sucker can be deformed elastically to fill the corrugated gaps of the rough surface, so that the first layer of the sucker is bonded onto the surface closely to prevent ambient air from entering the space between the sucker and the rough surface to keep the vacuum state of the sucker and to attach the sucker to the rough surface closely and stably.

According to another advantage of the present invention, the second layer of the sucker can prevent the sucker from being deformed excessively so that the sucker is attached to the rough surface exactly and solidly.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
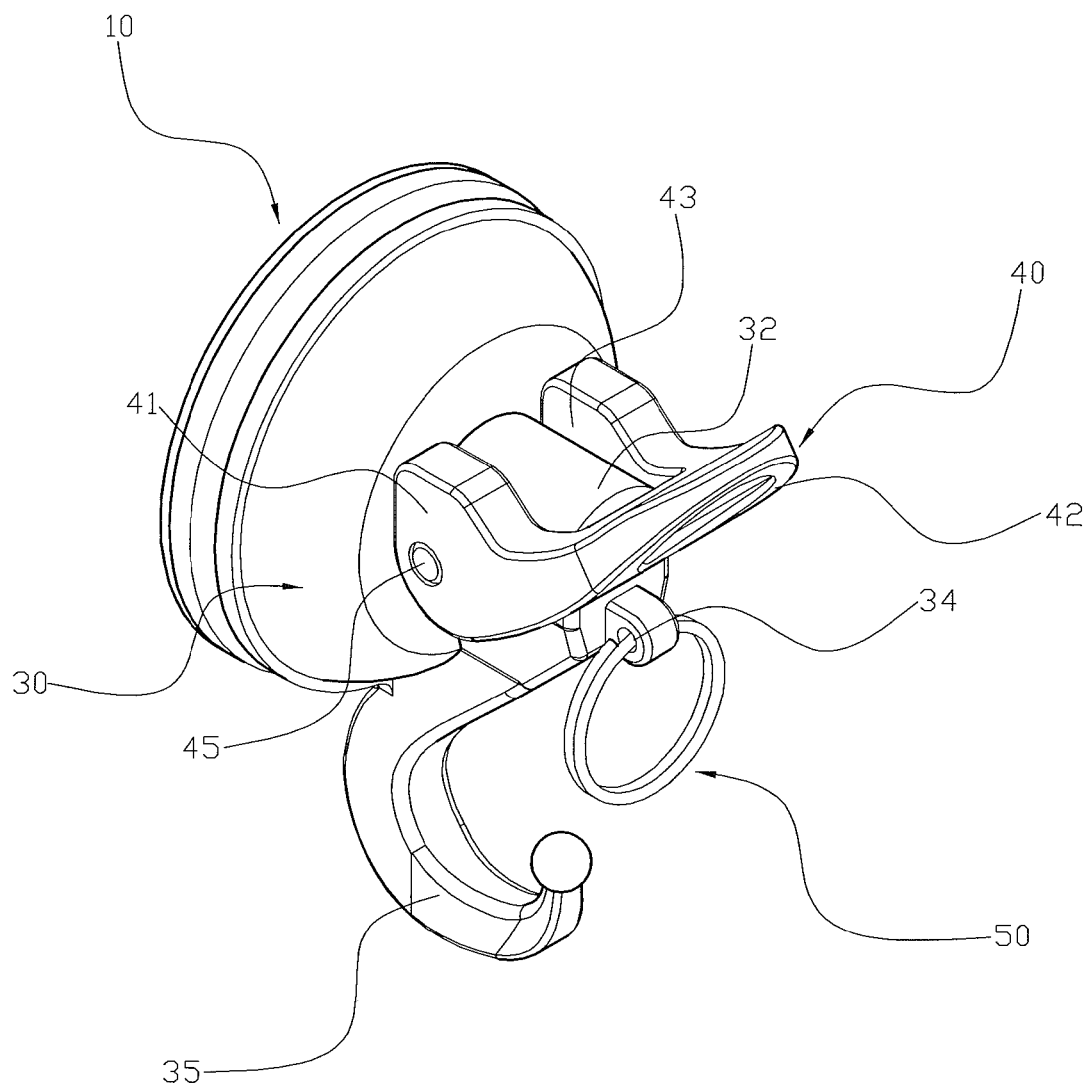
FIG. 1 is a perspective view of a sucker assembly in accordance with the preferred embodiment of the present invention.
Figure 2:
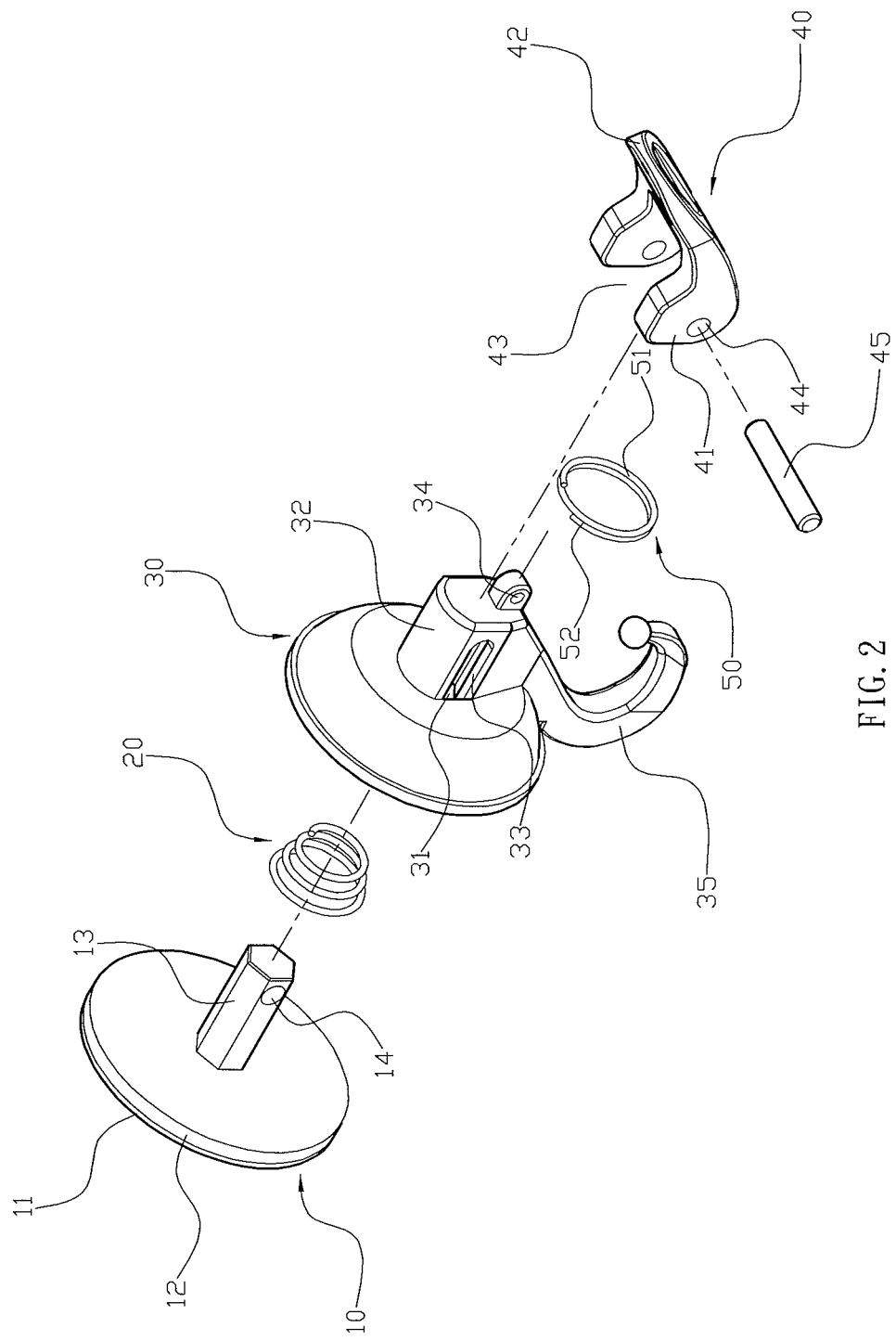
FIG. 2 is an exploded perspective view of the sucker assembly as shown in FIG. 1.
Figures 3, 4, 4A:
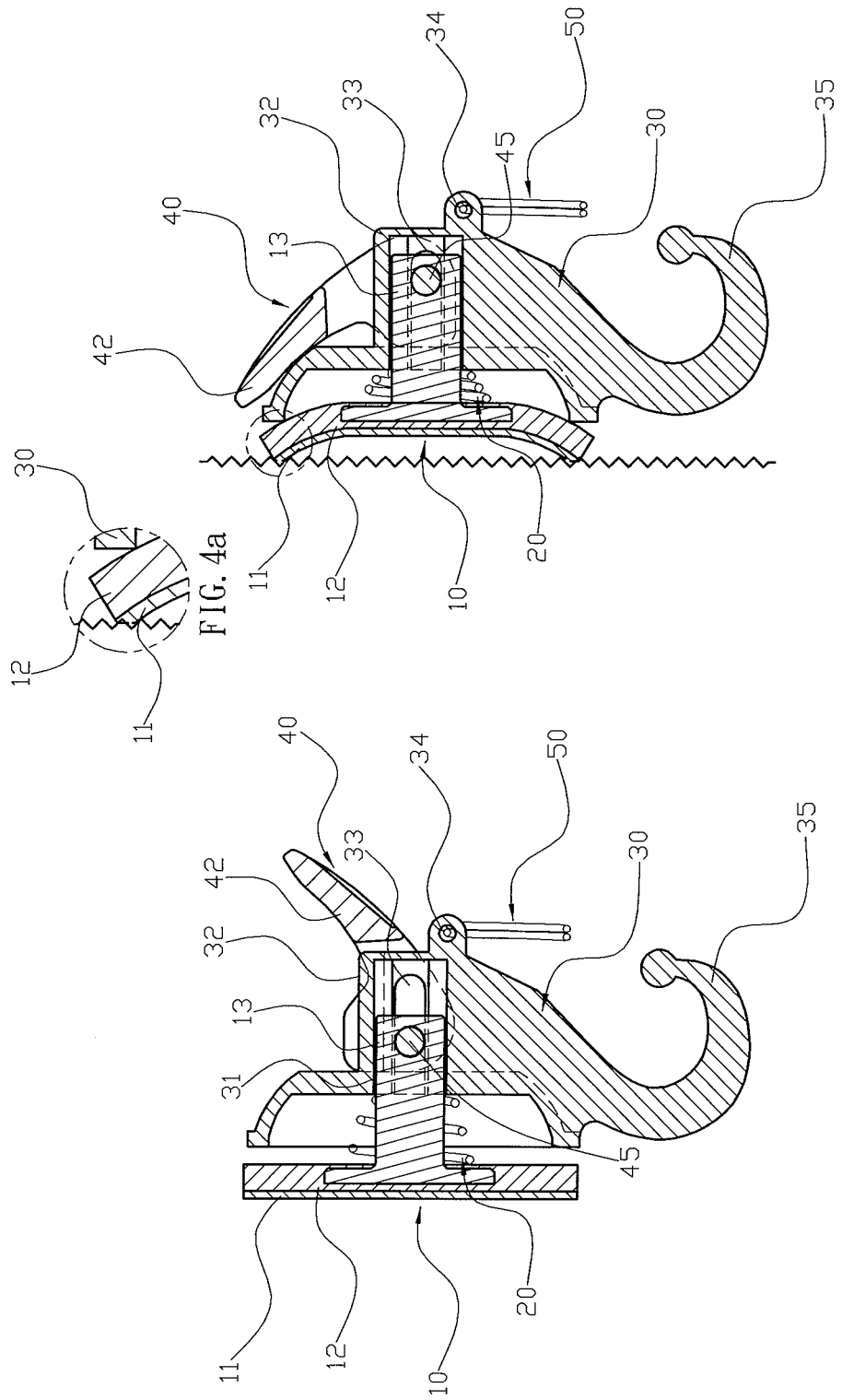
FIG. 3 is a side cross-sectional view of the sucker assembly as shown in FIG. 1.
FIG. 4 is a schematic operational view of the sucker assembly as shown in FIG. 3 in use.
FIG. 4a is a locally enlarged view of the sucker assembly as shown in FIG. 4.

Referring to the drawings and initially to FIGS. 1-3, a sucker assembly in accordance with the preferred embodiment of the present invention comprises a sucker 10, a pull bar 13 secured on the sucker 10, a hollow pressing seat 30 mounted on the pull bar 13 and having a peripheral rim encompassing the sucker 10, an elastic member 20 mounted on the pull bar 13 and biased between the sucker 10 and the pressing seat 30, a control handle 40 pivotally mounted on the pressing seat 30, and a pivot shaft 45 extending through the control handle 40, the pressing seat 30 and the pull bar 13 to connect the control handle 40 with the pull bar 13.

The sucker 10 includes a first layer 11 and a second layer 12 combined with the first layer 11. The first layer 11 of the sucker 10 is made of flexible and elastic material. The second layer 12 of the sucker 10 is made of hard material and has a hardness greater than that of the first layer 11. The second layer 12 of the sucker 10 is located between the first layer 11 of the sucker 10 and the pull bar 13. The second layer 12 of the sucker 10 faces the pressing seat 30 and is movable to press the peripheral rim of the pressing seat 30. In the preferred embodiment of the present invention, the first layer 11 and the second layer 12 of the sucker 10 laminate each other.

The pressing seat 30 has a disk shape and has an central portion formed with a receiving chamber 31. The pressing seat 30 has a side provided with a protruding hollow housing 32 connected to the receiving chamber 31 of the pressing seat 30. The housing 32 of the pressing seat 30 has two opposite sidewalls each formed with a guide slot 33 connected to the receiving chamber 31 of the pressing seat 30. The guide slot 33 of the housing 32 has an elongate shape and extends in an axial direction of the housing 32. The housing 32 of the pressing seat 30 has a periphery provided with a hanging hook 35. The housing 32 of the pressing seat 30 has a first end extending from the pressing seat 30 and a second end provided with a perforated support ear 34 for mounting a ring 50. The ring 50 consists of a plurality of circles 51 and has two distal ends each formed with an entrance 52 to allow entrance of the support ear 34 of the housing 32.

The control handle 40 has a first end provided with a pressing portion 41 pivotally mounted on the pivot shaft 45 in an eccentric manner and pressing the pressing seat 30 and a second end provided with a driving portion 42. The pressing portion 41 of the control handle 40 has a substantially forked shape and has an inner portion formed with a mounting recess 43 pivotally mounted on the housing 32 of the pressing seat 30. The pressing portion 41 of the control handle 40 has two opposite sidewalls each formed with a pivot hole 44 pivotally mounted on the pivot shaft 45 in an eccentric manner. The pivot hole 44 of the pressing portion 41 is connected to the mounting recess 43.

The pull bar 13 is movably mounted in the receiving chamber 31 of the pressing seat 30 and the housing 32 of the pressing seat 30. The pull bar 13 extends from a central portion of the second layer 12 of the sucker 10 and has a first end secured in the second layer 12 of the sucker 10 and a second end formed with a fixing hole 14 secured on the pivot shaft 45 and aligned with the guide slot 33 of the housing 32.

The pivot shaft 45 in turn extends through the pivot hole 44 of the control handle 40, the guide slot 33 of the housing 32 and the fixing hole 14 of the pull bar 13 to pivotally connect the control handle 40 with the housing 32 of the pressing seat 30 and the pull bar 13 and to attach the pull bar 13 to the housing 32 of the pressing seat 30. The pivot shaft 45 is movable in the guide slot 33 of the housing 32.

In operation, referring to FIGS. 3, 4 and 4a with reference to FIGS. 1 and 2, the first layer 11 of the sucker 10 is placed on a surface, such as a vertical wall and the like. When the driving portion 42 of the control handle 40 is driven, the pressing portion 41 of the control handle 40 is pivoted about the pivot shaft 45 in an eccentric manner and presses the pressing seat 30 to pull the pull bar 13 toward the housing 32 of the pressing seat 30 and pull the sucker 10 toward the pressing seat 30 that the sucker 10 is compressed and deformed by the peripheral rim of the pressing seat 30 to produce a vacuum suction force between the and the sucker 10 to attach the sucker 10 to the surface exactly. At this time, the first layer 11 of the sucker 10 can be deformed elastically to fill the corrugated gaps of the surface even if the surface is a rough or rugged surface as shown in FIGS. 4 and 4a, so that the first layer 11 of the sucker 10 is bonded onto the surface closely to prevent ambient air from entering the sucker 10 to keep the vacuum state of the sucker 10 and to attach the sucker 10 to the surface closely and stably. In addition, the second layer 12 of the sucker 10 can prevent the sucker 10 from being deformed excessively so that the sucker 10 is attached to the surface exactly and solidly.

Figure 5:
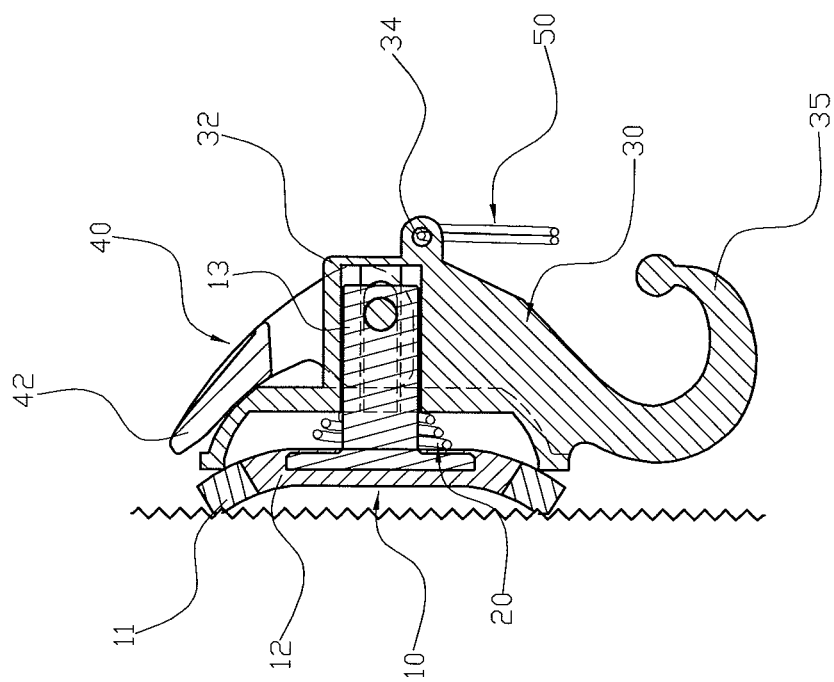
FIG. 5 is a side cross-sectional view of a sucker assembly in accordance with another preferred embodiment of the present invention.

As shown in FIG. 5, the second layer 12 of the sucker 10 is inserted into the first layer 11 of the sucker 10.

Figure 6:
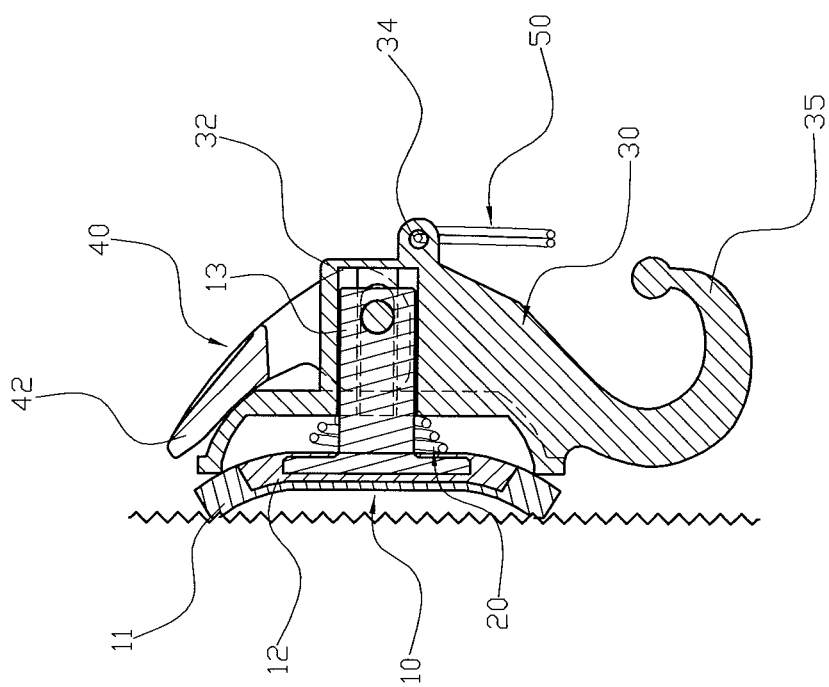
FIG. 6 is a side cross-sectional view of a sucker assembly in accordance with another preferred embodiment of the present invention.

As shown in FIG. 6, the second layer 12 of the sucker 10 is extended through and is concentric with the first layer 11 of the sucker 10.

Figure 7:
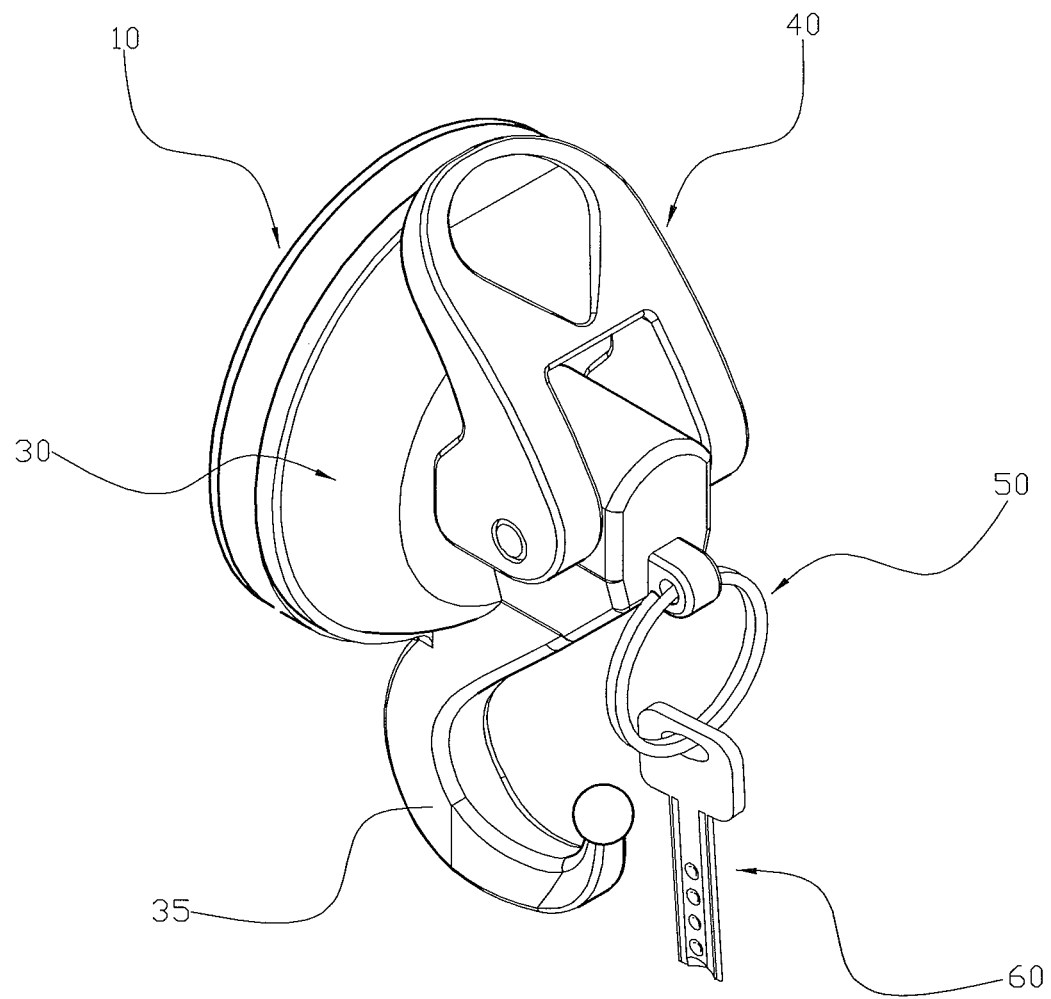
FIG. 7 is a schematic operational view of the sucker assembly as shown in FIG. 1 in use.
Figure 8:
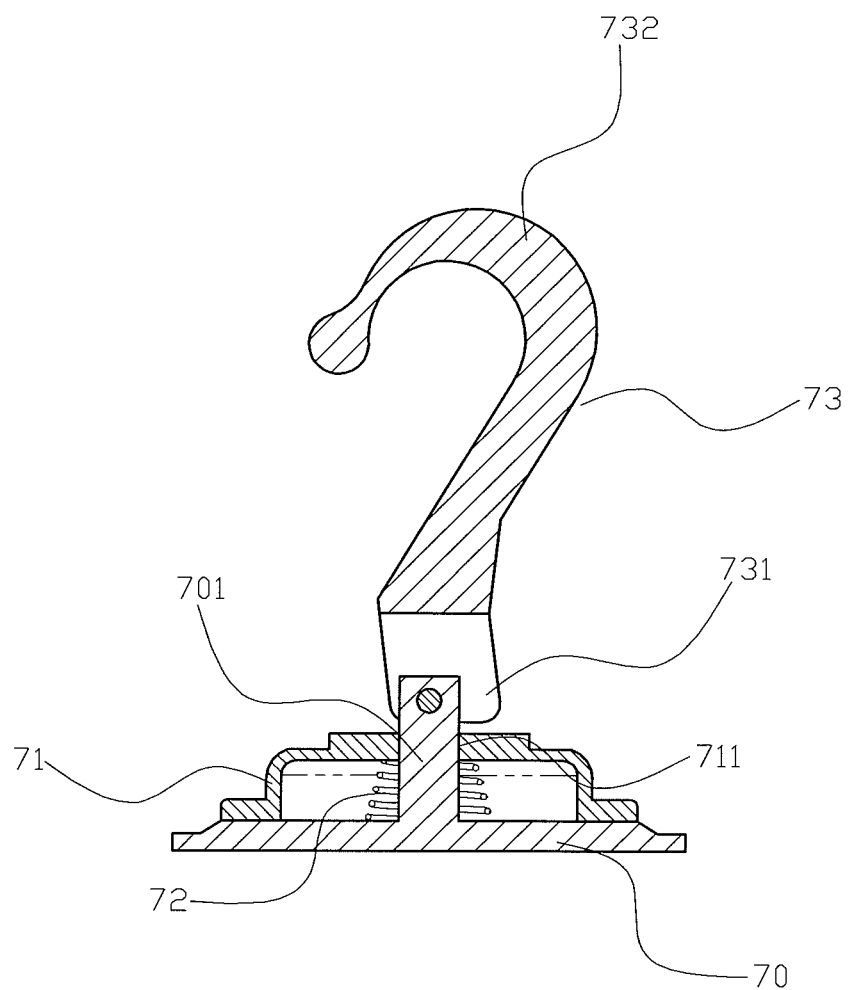
FIG. 8 is a side cross-sectional view of a conventional sucker assembly in accordance with the prior art.
Figure 9:
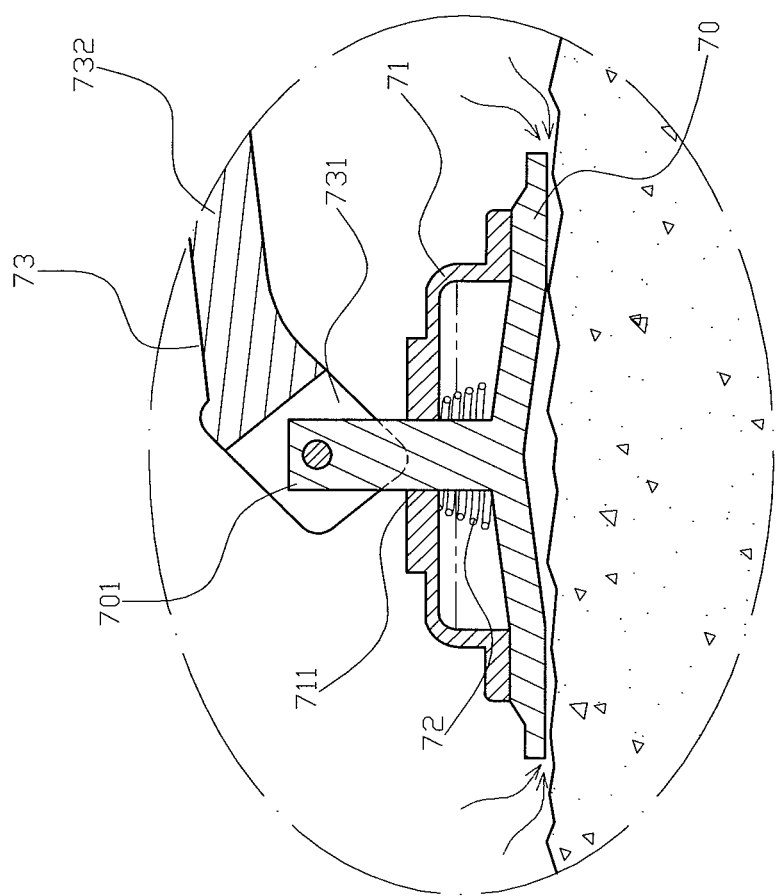
FIG. 9 is a schematic operational view of the conventional sucker assembly as shown in FIG. 8 in use.

As shown in FIG. 7, the ring 50 is used to hang an article, such as a key 60 and the like. In addition, hanging hook 35 is used to hang an article, such as a bag and the like.

Accordingly, when the sucker 10 is placed on a rough surface, the first layer 11 of the sucker 10 can be deformed elastically to fill the corrugated gaps of the rough surface, so that the first layer 11 of the sucker 10 is bonded onto the surface closely to prevent ambient air from entering the space between the sucker 10 and the rough surface to keep the vacuum state of the sucker 10 and to attach the sucker 10 to the rough surface closely and stably. In addition, the second layer 12 of the sucker 10 can prevent the sucker 10 from being deformed excessively so that the sucker 10 is attached to the rough surface exactly and solidly.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A sucker assembly comprising:
   a sucker;
   a pull bar secured on the sucker;
   a hollow pressing seat, wherein the hollow pressing seat has a disk shape and has a central portion formed with a receiving chamber, wherein the hollow pressing seat has a side provided with a protruding hollow housing connected to the receiving chamber, wherein the protruding hollow housing of the hollow pressing seat has two opposite sidewalls each formed with a guide slot connected to the receiving chamber, wherein the guide slot of the protruding hollow housing has an elongate shape and is elongated in an axial direction of the protruding hollow housing, wherein the hollow pressing seat is mounted on the pull bar and has a peripheral rim encompassing the sucker;

an elastic member mounted on the pull bar and biased between the sucker and the hollow pressing seat;

a control handle pivotally mounted on the hollow pressing seat, wherein the control handle has a substantially forked shape; and a pivot shaft extending through the control handle, the hollow pressing seat and the pull bar to connect the control handle with the pull bar, wherein the control handle has a first end provided with a pressing portion pivotally mounted on the pivot shaft in an eccentric manner and pressing against the hollow pressing seat and a second end provided with a driving portion, wherein the pressing portion of the control handle has two opposite sidewalls each formed with a pivot hole pivotally mounted on the pivot shaft, wherein the axial direction of the protruding hollow housing extends perpendicular to the pivot hole and the pivot shaft; wherein:

the pull bar is movably mounted in the receiving chamber of the hollow pressing seat and the protruding hollow housing of the hollow pressing seat;

the sucker includes a first layer and a second layer combined with the first layer;

the first layer of the sucker is made of flexible and elastic material;

the second layer of the sucker is made of a material having a hardness greater than that of the first layer;

the second layer of the sucker faces the hollow pressing seat and is movable to directly press against the peripheral rim of the hollow pressing seat;

the pull bar extends from a central portion of the second layer of the sucker and has a first end secured in the second layer of the sucker and a second end formed with a fixing hole secured on the pivot shaft and aligned with the guide slot of the protruding hollow housing, with the first and second ends of the pull bar being spaced in the axial direction of the protruding hollow housing;

the second layer of the sucker is located between the first layer of the sucker and the pull bar;

the pivot shaft in turn extends through the pivot hole of the control handle, the guide slot of the protruding hollow housing and the fixing hole of the pull bar to pivotally connect the control handle with the protruding hollow housing of the hollow pressing seat and the pull bar and to attach the pull bar to the protruding hollow housing of the hollow pressing seat; and the pivot shaft is movable in the axial direction of the protruding hollow housing and perpendicular to the pivot shaft in the guide slot of the protruding hollow housing; and wherein the protruding hollow housing of the hollow pressing seat has a first end extending from the hollow pressing seat and a second end provided with a perforated support ear for mounting a ring.

2. The sucker assembly of claim 1, wherein the first layer is laminated on the second to define a layered structure.

3. The sucker assembly of claim 1, wherein the second layer of the sucker is inserted into the first layer of the sucker.

4. The sucker assembly of claim 1, wherein the second layer of the sucker is extended through and is concentric with the first layer of the sucker.

5. The sucker assembly of claim 1, wherein the protruding hollow housing of the hollow pressing has a periphery provided with a hanging hook.

* * * * *